United States Patent [19]

Lenhart

[11] Patent Number: 4,521,130
[45] Date of Patent: Jun. 4, 1985

[54] AIR TRANSPORT SYSTEM

[75] Inventor: Ronald A. Lenhart, Lakewood, Colo.

[73] Assignee: Precision Metal Fabricators, Inc., Arvada, Colo.

[21] Appl. No.: 591,942

[22] Filed: Mar. 21, 1984

Related U.S. Application Data

[62] Division of Ser. No. 947,441, Oct. 2, 1978, Pat. No. 4,451,182.

[51] Int. Cl.³ .............................................. B65G 51/02
[52] U.S. Cl. ........................................................ 406/86
[58] Field of Search ...................................... 406/86, 88

[56] References Cited

U.S. PATENT DOCUMENTS

| | | | |
|---|---|---|---|
| 3,105,720 | 10/1963 | Barker | 406/88 |
| 3,684,327 | 8/1972 | Hurd | 406/88 X |
| 3,850,478 | 11/1974 | Hurd | 406/88 X |
| 4,010,981 | 3/1977 | Hodge | 406/88 |

*Primary Examiner*—Jeffrey V. Nase
*Attorney, Agent, or Firm*—Fields, Lewis, Pittenger & Rost

[57] ABSTRACT

A pneumatic elevator for containers is provided wherein a vertical duct has end portions with nozzles in the form of holes extending through the ends and entering the duct in a downstream direction. The sides of the duct are provided with guide rails and at least one side is provided with a plurality of apertures along the length thereof through which air, introduced into the duct through the end nozzles, is exhausted. The size and angle of the nozzles are correlated with the static pressure differences across the jets to provide the requisite duct static pressure with respect to the size and number of apertures in the inner side which determines the volume of air exhausting from the can duct. Differential static air pressure separates each can from the other to minimize scratching and denting. The lower end of the elevator may be provided with an in-feeder to feed cans into the elevator from storage or from an accumulator and the upper end of the elevator may exhaust into a deaccelerator which slows down the cans coming from the elevator and positions them at the proper speed and spacing for the subsequent work station.

7 Claims, 14 Drawing Figures

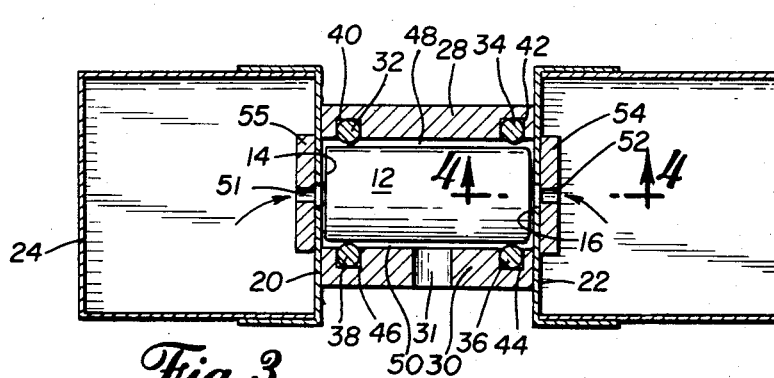
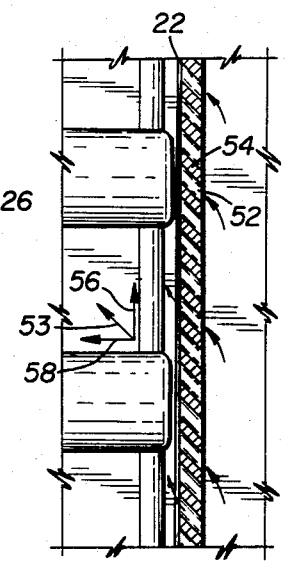
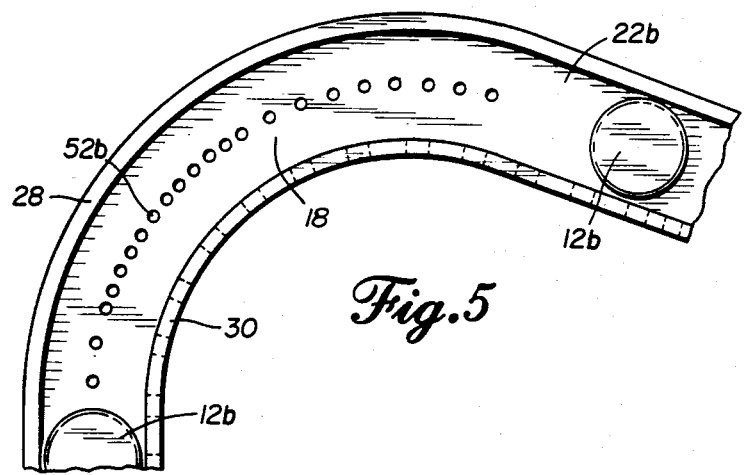
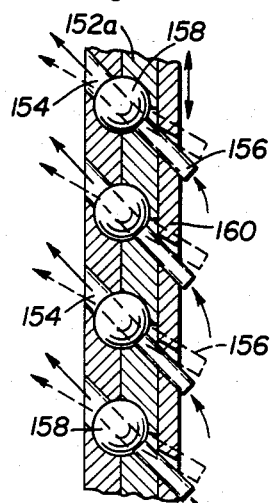
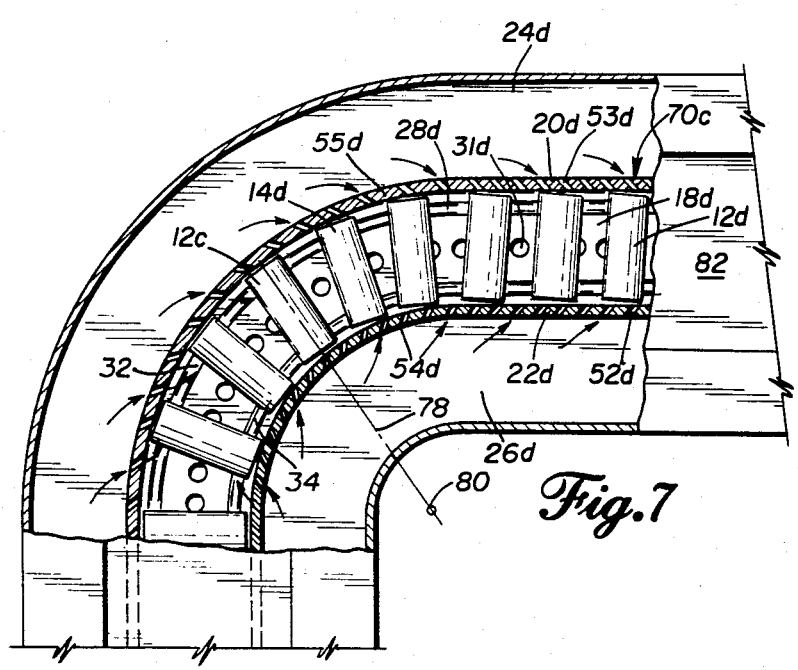

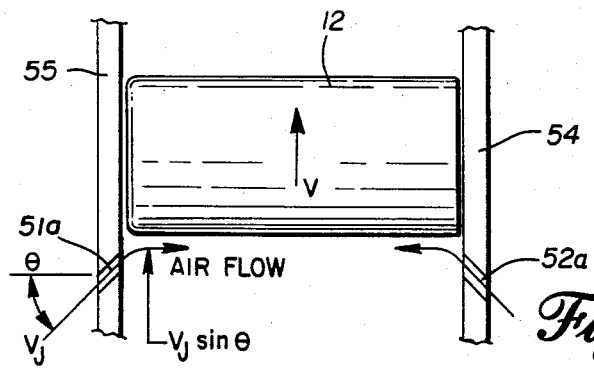
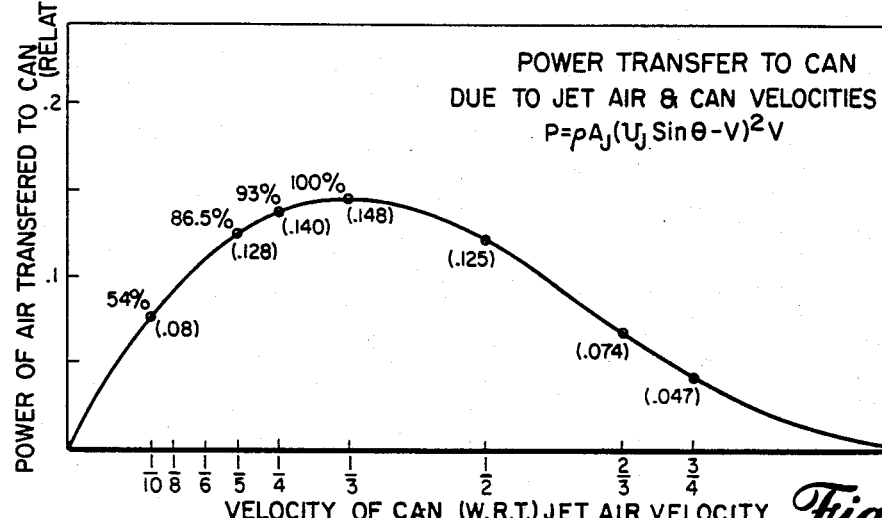
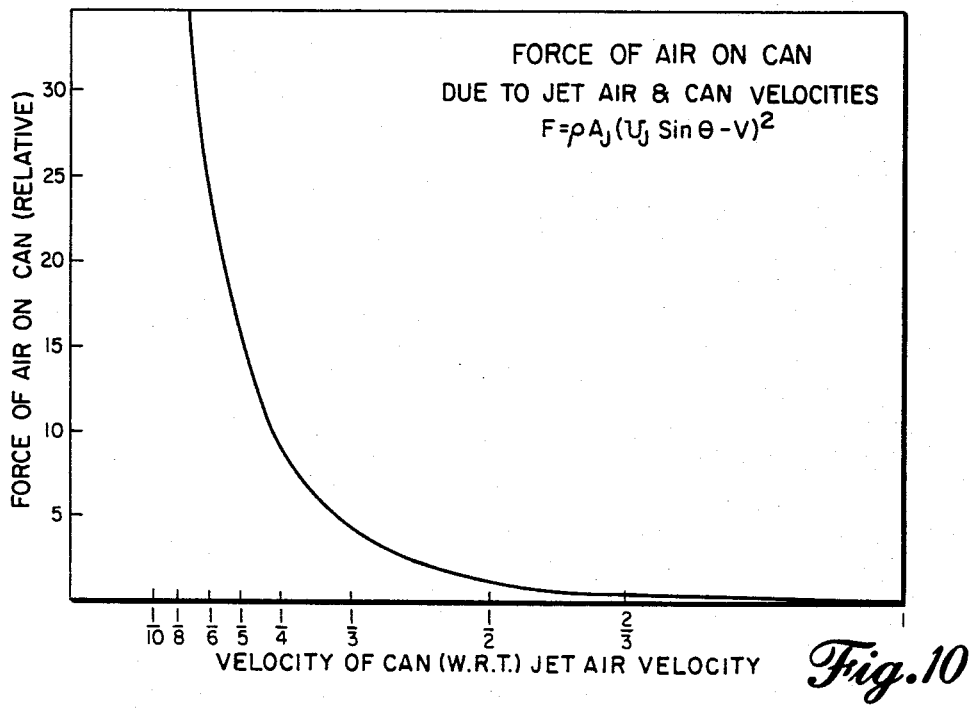

AIR TRANSPORT SYSTEM

FIELD OF INVENTION

This is a division of U.S. patent application Ser. No. 947,441, filed Oct. 2, 1978 now issued as U.S. Pat. No. 4,451,182.

This invention relates to a container transportation system in which air is the transport medium and the containers provide dynamic reaction with the air and coact with the transport structure to control and transport the containers. The transport system may include an in-feeder to establish a predetermined spacing between containers, an elevator for moving containers between two different levels at the predetermined spacing or other spacing and a de-accelerator for de-accelerating the containers for introduction into a work station or a combination of any or all of these. Additionally, the system may include a fan conveyor to permit delivery of containers in an upright position as well as a horizontal conveyor of containers in either upright or horizontal position.

DESCRIPTION OF PRIOR ART

Air lift conveyors have been used for conveying various kinds of particulate material as well as packages or similar articles. A disadvantage of the prior art lift conveyors is that the lift and transport is dependent upon the shape and arrangement of the air nozzles which differ with the material being handled. Usually the nozzles are in the form of holes extending through the deck or side wall of a conveyor and entering the conveyor channel in a downstream direction. Another popular form resembles a series of louvers, U.S. Pat. No. 3,759,579, providing laterally extending slots through which the air passes with a substantial downstream velocity to not only support the material but also to propel it along the conveyor channel.

Most elevators, that is conveyors for vertical transport of articles and in particular cans, make use of a belt arrangement where belts are provided on each side of the cans to grip the cans and propel them in a vertical direction. The belts on either side of the cans travel in a direction such that the belts in contact with the cans move in the same direction.

If the tension on the belts is too great, the can per minute rate (CPM) of the elevator will be reduced because cans cannot be fed fast enough and may be deformed. If the belt tension is too loose, the belts will slip on the cans and the elevator will jam. Additionally, if the belts slip on the cans they may be severely marked.

The jamming of the mechanical elevators is a major problem and time lost in downtime to clear such jams is both costly and dangerous. The frequent tuning and adjusting of the belts is necessary to assure even reasonably satisfactory operation. This requires that the elevator be shut down for a period of time. Many mechanical elevators are as high as 40 or 50 feet and belt tensioners are positioned on both sides at intervals from 12 to 16 inches. In most cases, three belts are used, two on one side and one on the other, all of which must be adjusted. When the belts stretch, portions must be removed to compensate. With lost time production rates in the can industry in the range of $16,000 to $20,000 an hour and an average clearing time of a jam in an elevator taking two to five minutes, with jams occurring on an average of two an hour, the monetary loss in a 24 hour plant is considerable.

The safety problems with mechanical elevators are quite extensive. The can per minute (CPM) rate of mechanical elevators is restricted as the spacing between cans is usually about one foot. Thus, a 1000 CPM rate requires a 1000 feet per minute (FPM) operation of the elevator. As higher speed equipment is introduced, elevator speeds must be increased to maintain production. As faster and faster speeds are required, the rate of travel of the belts that grip the cans reaches a high enough velocity that the slippage on the can at the pick-up point is self-defeating. There are also problems experienced with reverse rotation of the cans at discharge with these high can speeds. Further, the danger of can damage becomes greater due to can-to-can contact as well as possible destruction of the machinery at such high speeds.

U.S. Pat. No. 4,010,981 is directed to an "Air Conveyor With Tunnel Guide" which includes an air conveyor combined with a tunnel guide member. The air conveyor includes an elongated plenum chamber having a perforated deck having transverse slots forming directional air jets. An imperforate wall tunnel guide member confronts the air jets and extends along the conveyor to define a conveying zone. The guide has for its purpose of trapping and conserving of the conveying air and air gaps are provided between the marginal edges of the tunnel guide wall and the conveyor surface to prevent build up of undesired back pressure or static pressure within the conveying zone.

SUMMARY OF THE INVENTION

According to the invention, a can duct is provided having end portions with nozzles in the form of holes extending through the ends and entering the can duct in a downstream direction. The sides of the can duct are provided with guide rails and at least one side, such as the side forming the inside radii, is provided with a plurality of apertures along the length thereof through which air introduced into the can duct, through the end nozzles, is exhausted. The size and angle of the nozzles are correlated with the static pressure (SP) difference across the jets to provide the requisite can duct static pressure with respect to the size and number of apertures in the inner side which determine the volume of air exhausting from the can duct. The nozzles in the ends of the can duct are supplied with air from air supply ducts of which the can duct ends may be one wall and the supply ducts extend for the full length of the can duct; however, the air supply ducts may be made up of a plurality of shorter ducts supplied by a number of fans or a full length duct with a single fan.

The lower end of the elevator may be provided with an in-feeder to feed cans into the elevator from storage or an accumulator such as a single filer of the type set forth and disclosed in my application for U.S. Letters Patent Ser. No. 869,371, filed Jan. 13, 1978, now U.S. Pat. No. 4,182,586. The upper end of the elevator may exhaust into a de-accelerator which slows down the cans coming from the elevator and positions them in speed and spacing to be received by subsequent work stations and the like.

Referring now to the drawings:

FIG. 3 is a cross sectional view taken along line 3—3 of FIG. 2;

FIG. 4 is a cross sectional view along line 4—4 of FIG. 3;

FIG. 5 is a diagrammatic representation of the de-accelerator section;

FIG. 6 is a view in cross section of a variable angle nozzle embodiment;

FIG. 7 is a cross sectional view of an air elevator fan section similar to that shown by dotted lines in FIG. 1 as well as a horizontal section with parts broken away to conserve space;

FIG. 8 is a diagrammatic representation of the cross sectional portion of FIG. 1 illustrating the velocity components of the air and can;

FIG. 9 is a graphical representation of the Power Transfer to Can Due to Jet Airstream and Can Velocities;

FIG. 10 is a graphical representation of the Force of Air on Can Due to Jet Airstream and Can Velocities;

Figures 1, 2:
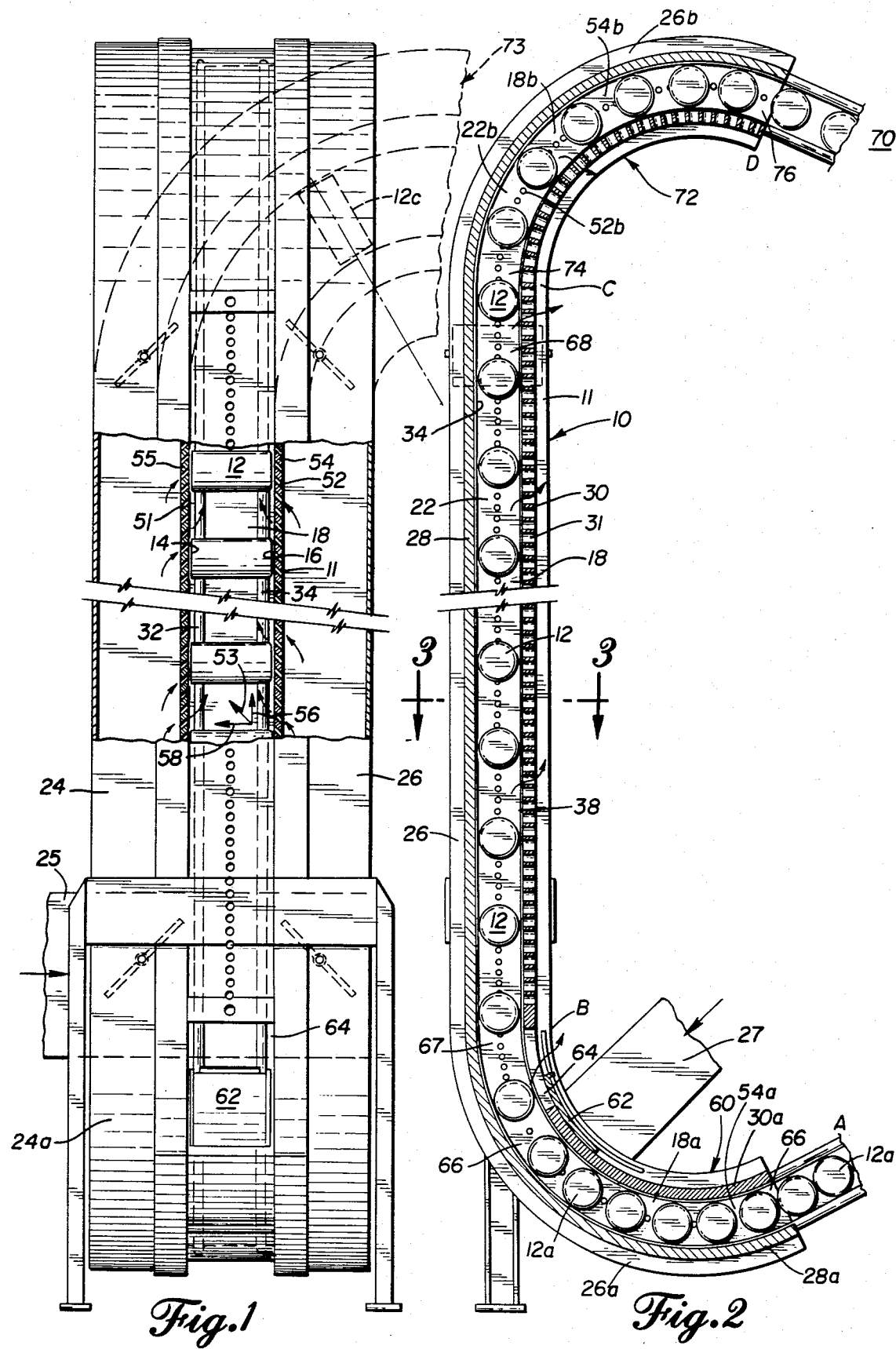
FIG. 1 is a front view in elevation of a portion of the transportation system according to this invention including an in-feeder section, an elevator section and a de-accelerator section partly in cross section and partly broken away to conserve space.
FIG. 2 is a side elevational view in cross section and partly broken away.

Referring now to FIGS. 1, 2, 3, and 4 of the drawings, there is provided a vertically positioned elevator referred to generally by the reference numeral 10 and extending roughly from point B to point C. The embodiment disclosed is designed for use in elevating empty cans 12 which have one end 14 open and one end 16 closed. The elevator body 11 is generally of rectangular cross section providing a rectangular can duct 18 corresponding substantially to the profile of the cylindrical cans 12. The can duct size is controlled close enough to the actual can size that an effective workable air seal is established around each can in the duct, while permitting easy passage of the cans through the duct. The can duct has end guides 20 and 22 adjacent the open end and the closed end of the cans 12. The end guides also form one wall of rectangular air supply ducts 24 and 26 which are connected to a suitable supply of air such as from fans as at 25 and 27. The can duct is also provided with a pair of sides 28 and 30 of a length just slightly greater than the length of the can sufficient to provide clearance between the end guides and the can. A pair of guide rails 32, 34 and 36, 38 are positioned in grooves 40, 42 and 44, 46 in the sides 28 and 30, respectively, adjacent each edge thereof and positioned adjacent the end guides 20 and 22. The guide rails are positioned to extend only slightly above the inner surface of the sides 28 and 30 of the can duct 18 to provide a very small clearance 48 and 50 between inner surface of the sides 28 and 30 and the sides of the can 12.

A series of air jet holes 51 and 52 are provided in end guides 20 and 22 along the length thereof in approximately centered relation interconnecting the air supply ducts 24 and 26 with the can duct 18 at each end thereof. The holes 51 and 52 are bored at an angle to enter the can duct 18 in a downstream direction and are positioned at an angle in the range from about 18° to about 60° off normal to the longitudinal axis of the can duct. Where the end guides 20 and 22 are of insufficient thickness to provide the necessary directivity to the bore holes 51 and 52, the bores 51a and 52a, FIG. 8, may be provided in jet boards 54 and 55 of sufficient thickness to provide the desired directivity secured by suitable means to the wall forming the end guides 20 and 22 common to the air supply ducts 24 and 26. The jets 51 and 52 may be of different sizes and angles and of differing sizes and angles depending upon the results desired as will be explained presently.

At least one of the sides 30 of the can duct 18 is provided with a series of exhaust apertures 31 serially positioned along the length of the can duct communicating the can duct with the immediately adjacent ambient atmosphere. The size and the spacing of the holes can be varied to suit a particular set of conditions although the apertures are normally only located in one of the sides and that preferably being the side forming the inside radius of any curvature such as the discharge elbow in the elevator for reasons to be explained. The particular side of the elevator on which the exhaust apertures are located will determine the direction of rotation, if any, that will be imparted to the cans in passing through the can duct. The cans will tend to hug the rails positioned on the side containing the exhaust apertures and thus the rotation of the leading edge of the can will be toward the exhaust openings. This means that the cans will be in contact or near contact with those rails on the inside radius of a curve and will avoid reverse rotational effects of contact with the rails on the outside radius of a curve. This rotational feature to be preferred as the coefficient of friction is substantially reduced and the marking of cans is minimized or eliminated.

Also, the rotation effect assures that where the interior of a can has been coated, that the coating remains in suspension until set up. The rotation of the cans with respect to the discharge direction is controlled so that the desired rotation is established prior to discharge to avoid a reverse rotational or a non-rotational lag time. This is extremely important in those cases where a high can per minute rate is desired and the discharge velocity of the cans must be held or reduced to a low figure. Where a high can per minute rate is desired, the cans must be spaced close together.

With the air elevator according to this invention, the obtaining of can spacing of four to five inches and closer between cans is achieved and maintained easily. Thus, the air elevator operating at can speeds of 750 to 800 feet per minute (FPM) can deliver 1,400 cans per minute (CPM). Closer spacing can be maintained at the same or lower FPM rates for higher production rates without the attendant difficulties of the mechanical elevator. Should downstream equipment fail and result in cans backing up, a mechanical elevator must be stopped or at least the feeding of cans to the elevator must be stopped while the air elevator according to the present invention can fill with cans without danger of damage to the cans. Further, the elevator will provide accumulation and the possibility of jamming is non-existent since pressures that are applied on the cans are substantially uniform and not at any one point. The present system has the further advantage in that the elevator will clear and resume production without further adjustment.

The air elevator of this invention is a semi-enclosed system with respect to the can duct. The air velocity from the jets 51 and 52 is preferably established on the basis of the optimum jet size for the acceptable jet and duct velocity for the optimum power transfer and the lowest cubic feet per minute (CFM) from fans 25 and 27 necessary to support and transport a particular can size and weight. The appropriate jet air velocity is established by a static pressure difference across the jets at selected points along its length. From test results based upon operating systems, certain empirical relationships have evolved.

It has been found that air jet nozzles formed by a ¼ inch diameter bore will provide a jet air velocity of about 3400 feet per minute (FPM) at a static pressure of 1 inch of water and will require 1.16 cubic feet of air per minute (CFM) according to Equation 1:

$$A_j \times V_j = Q \qquad (1)$$

Test results have shown that as the jet nozzle hole size is reduced below about ¼ inch, the velocity is reduced along with the volume flow rate. Where hole sizes larger than ¼ inch diameter are used, the air velocity achieved is only slightly greater but the cubic feet per minute of air delivered is considerably greater. The air elevator of this invention is predicated on optimizing the design to operate at the lowest static pressure that will give an efficient jet air velocity with respect to the required can velocity, and at a jet diameter that will provide sufficient C.F.M. to give the necessary lift to maintain the required can flow rate.

For best results and lowest friction loss through the holes or nozzles 51 and 52, the wall thickness or jet boards 54 and 55 through which the hole is bored is preferably not thicker than one and one-half the diameter of the hole nor so thin in relation to the hole direction as to permit any significant amount of air to pass through the hole without having a downstream directivity imparted thereto.

The angle of the holes or bores 51a and 52a, FIG. 8, through the jet boards 54 and 55 affects the speed of the cans in the can duct and for an elevator operating at a can speed of about 750 to 800 FPM to handle about 1400 cans per minute, the holes are preferably positioned at about 45° with respect to a line normal to the direction of can flow for the desired operation. The air issuing from the jets 51a and 52a impinge on the can and transmit a force 53 which can be broken down into components or vectors including a vertical force represented by arrow 56 as well as a horizontal force represented by arrow 58, FIG. 4. The forces represented by arrow 58 tend to center the can endwise in the can duct and the forces represented by arrow 56 tend to move the cans up or through the can duct.

The definition of terms with units used in the equations are set forth in Table I.

TABLE I
GLOSSARY $P_o$ = Power (lbf-ft)/min
$F$ = Force (lbf)
$M$ = Mass flow rate of cans (lbf-min)/ft.
$\dot{m}$ = Mass flow rate of air (lbf-min)/ft.
$V$ = Velocity of cans (ft/min)
$V_j$ = Velocity of air through jet (ft/min)
$V_v$ = Velocity of air through vents (ft/min)
$V_r$ = Relative velocity of air with respect to can
$W$ = Weight of all cans in elevator at one time (lbf)
$g$ = Acceleration of gravity (ft/min$^2$)
$t$ = Time (min)
$P$ = Static pressure in can duct (in.H$_2$O)
$\phi$ = Static pressure in supply duct (in.H$_2$O)
$\Delta\phi$ = Static pressure difference across jets between supply and can duct (in.H$_2$O)
$A$ = Cross sectional area of can (ft$^2$) through the axis of rotation
$K$ = Velocity constant (ratio of can to jet velocity) (Dimensionless)
$\theta$ = Angle of jet from horizontal (Degrees)
$D_j$ = Diameter of jet (Inches)
$D_v$ = Diameter of vent (Inches)
$Q$ = Volume flow rate of air (ft$^3$/min)
$A_j$ = Area of jet (ft$^2$)
$A_v$ = Area of vent (ft$^2$)
$N$ = Number of jets per vent (Dimensionless)
$\rho$ = Air Density (lbf-min$^2$)/ft$^4$
$K_d$ = Diameters constant (Dimensionless)
$K_j$ = Jet velocity constant (Dimensionless)
$K_v$ = Vent velocity constant (Dimensionless)
$K_f$ = Force constant (Dimensionless)
$w$ = Weight of one can Since the air jets 51a and 52a are introducing air at intervals of from ¾ to 1½ inches along the ends of the can duct for its entire length, the cubic feet per minute of air introduced will essentially double for any given interval. Air must be allowed to be discharged through the exhaust holes 31 located in at least one of the sides of the can duct. If air is not allowed to escape at a controlled rate along the length of the can duct, cans will not be allowed to enter the elevator or be introduced into the can duct area. On the other hand, if too much air is allowed to escape, the cushion of air between cans, which is a function of static pressure, will not be maintained and one can will then overtake the next can and, with each can depriving the other of the available energy, the cans will back up in the elevator. The vent and jet sizes are chosen to establish a pressure ratio across each can in the can duct, see Equation 16. The pressure is slightly less above each can and slightly greater below each can on a gradient all the way up the elevator, the greatest pressures being at the infeed decreasing all the way to ambient at the discharge. The pressure gradient offsets a predetermined portion of the weight of each can by giving the can an added lift by acting on the longitudinal cross sectional area of the can. The "effective weight" of each can is that portion of the weight of each can that is balanced by the lift due to the static pressure difference across each can in the can duct. Thus, it is seen that the volume of air introduced with respect to time in combination with the jet velocity as well as the duct velocity and the amount of air exhausted, and where, determines the can spacing and maintains the spacing established at the feed end of the elevator. The elevator and the feed must be adjusted and balanced for optimum results. It will be appreciated that the openings 31 may be holes of various shape, or a continuous elongated slot in one or more of the sides running the length of the can duct.

The principle of the Air Elevator operation according to this invention is that can movement up the elevator is accomplished efficiently by using a balance of two sources of power. The first of these power sources is the air jets positioned in the end guides of the elevator, which are used to transfer energy from the mass flow rate of the air through the jets to the can ends. This power source provides the force necessary to maintain the momentum of the can, i.e. maintain its velocity at the required can per minute rate, and also to provide that portion of the total force required to offset the weight of the cans or to provide the lifting force needed to support the can column. This source then provides all of the kinetic energy at work on the system and a portion of the potential energy required to lift the column of cans. The equation defining this force is:

$$F = \rho A_j (V_j \sin\theta - V)^2 \quad (4)$$

This equation is derived from an analysis of the air flow through the jets 51a and 52a depicted diagrammatically in FIG. 8.

Since $$F = MA \text{ (Force = Mass times Acceleration)} \quad (5)$$

$$F = \dot{m} V_r \text{ (Force = Mass Flow Rate times Velocity)} \quad (6)$$

Where: $V_r$ = the relative velocity of the air with respect to the can in the direction of the can motion. So $$V_r = V_j \sin\theta - V \quad (7)$$

The mass flow rate is $$\dot{m} = \rho A_j V_r \quad (8)$$

$$F = (\rho A_j V_r) V_r = \rho A_j V_r^2 \quad (9)$$

so $$F = \rho A_j (V_j \sin\theta - V)^2 \quad (10)$$

The second source of power is that of the infeeder 60 (whether it be by gravity, mechanical means, or air). The infeeder establishes the ability to provide a back pressure at the elevator entrance which in turn enables a greater than ambient static pressure to be maintained between the cans.

The back pressure or can duct static pressure provides two positive effects in the operation of the elevator; the first is that by maintaining a significantly greater than ambient can duct static pressure, an air cushion is established between the cans so that when the elevator is being fed intermittently and a single can enters and overtakes the pack, its velocity will be retarded by the air it must displace between the cans, thus avoiding impact between the cans which would cause can damage. The second positive effect of maintaining this positive can duct static pressure is that it can be used to compensate for the cumulative weight of cans above any one point in the elevator. For an example, assume that the cans in the elevator are being supported only by the static pressure between the cans. The can duct size is controlled close enough to the actual can size that an effective workable air seal is established around each can in the duct, within limits that allow easy passage of the can through the duct. The static pressure between each can then will vary according to the number of cans above it, the greatest can duct static pressure being at the elevator entrance and the lowest pressure at the discharge. Since the supply duct static pressure is constant all the way up the elevator, this can duct static pressure may be controlled either by maintaining a constant jet diameter while varying the outlet vent size or by varying the jet diameter while maintaining a constant outlet vent size or a combination of both. The force created by the static pressure between each can and acting on the area of the can is equal to the effective weight of all the cans above that point in the elevator. The pressure to area relationship, in theory, is described by the following relationships.

Since the volume flow rate in through the jets is equal to the volume flow rate out through the vents:

$$Q_{in} = Q_{out}, \text{ where } Q = \text{Volume Flow Rate} \quad (11)$$

$$Q_{in} = V_j A_j \quad (12)$$

$$V_j = 3400\sqrt{\Delta\phi} \quad (14)$$

$$V_v = 3400\sqrt{P} \quad (15)$$

and 3400 is in units of feet/minute so $3400\sqrt{\Delta\phi} N A_j = 3400\sqrt{P} A_v$ $$P = (NA_j/A_v)^2 \Delta\phi \quad (16)$$

Thus, by using the effect of both the force through the jets and the static pressure variance between the cans, a condition is achieved whereby the energy needed to raise the can (the potential energy of the system) can be supplied by the static pressure between the cans and the energy needed to maintain the can velocity (the kinetic energy of the system) is supplied by the jets. Also any variation of this can be achieved by allowing the jets to offset a portion of the weight thereby determining the back pressure and the infeed force required.

In analyzing the equation of force through the jets, one can determine the power transfer from the air to the cans.

Since $$F = \rho A_j (V_j \sin\theta - V)^2 \quad (17)$$

and since Power = Force times Velocity, the power imparted to the can is $$P = \rho A_j (V_j \sin\theta - V)^2 V \quad (18)$$

Assuming a constant jet air velocity, the maximum and minimum values of power transfer can be found by determining where the slope of the power equation = 0.

Since the slope of the equation is equal to the derivative of the equation $$dP/dV = 0 = \rho A_j (3V - V_j \sin\theta)(V - V_j \sin\theta) \quad (19)$$

so maximum power transfer occurs where $V = \frac{1}{3} V_j \sin\theta$ and minimum occurs when $V = V_j \sin\theta$ as illustrated by FIG. 9.

Analyzing the Force equation $$F = \rho A_j (V_j \sin\theta - V)^2 \quad (17)$$

and assuming a constant can velocity one can determine that as the jet velocity increases with respect to the can velocity that the force acting on the can increases. This force transfer is not linear with the power transfer since the power depends also on the velocity of the can, not just the relative velocities of the air to the can (see FIGS. 9 and 10).

In comparing the graphs of FIGS. 9 and 10, one can see that as the velocity of the can with respect to the jet air velocity goes above ⅓, the power transfer decreases and the force acting on the can also decreases. On the other hand, as the velocity of the can with respect to the jet air velocity goes below ⅓ the power transfer decreases again but the force acting on the can increases geometrically. For this reason, the preferred transporter design will use a jet velocity of about 3 times the velocity of the can. However, when transporting the cans in a vertical direction another force enters in, which is the acceleration of gravity, and is seen as the weight of each can. This weight must also be balanced, at least in part, by the force of the air through the jets. Therefore, a more desirable velocity ratio for vertical transport would be around 7 to 1 where the force of the air acting on each can is about 9 times what it was at 3 to 1 and yet the efficiency of power transfer has dropped to only about 70%. Where the weight of each can increases or where the total can column weight increases, velocity ratios above 7 to 1 to as high as 25 to 1 may be required. Thus, a compromise between the force required to lift the cans at the required rate and the efficiency of elevator operation due to the power transfer must be achieved.

The total pressure of air flowing in a duct is the sum of the static pressure and the velocity pressure, the static pressure being the bursting pressure (the pressure measured perpendicular to the flow), and the velocity pressure being the impact pressure (the pressure measured parallel to the flow). For isentropic (frictionless) flow, the value of total pressure can be considered to be a constant. Therefore, if the velocity of the air decreases (decreasing the velocity pressure), the static pressure will immediately increase. Since the flow through the supply duct is normally below 2000 ft./min. and turbulent, giving a high static pressure to velocity pressure ratio, almost all of the air mass flow rate through the jets is achieved by means of a high static pressure differential across the jets. Since the flow of real gases is not isentropic and there are frictional losses in moving the air along the length of the duct, these losses can be overcome by converting the velocity pressure into static pressure. This is accomplished by decreasing the velocity of the air in the duct. As the supply duct feeds air into the jets along the length of the duct, the supply duct velocity automatically decreases because the number of jets requiring air downstream from each point decreases. The supply duct cross sectional area is intentionally held substantially constant throughout the full length of the duct to decrease the velocity of the moving air thus increasing its static pressure. Therefore, with the air supply at the bottom or inlet of the elevator, the static pressure feeding the jets can be greatest at the outlet even though the total pressure of the system has decreased. Thereby the effect of frictional losses in the system have been overcome.

The equation relationships are set forth as follows:
Power to move cans at required velocity:

$$P_o = \dot{M}V^2, \quad \dot{M} = W/gt \quad (21)$$

Force to move cans at required velocity:

$$F = \dot{M}W \quad (22)$$

Pressure required in can duct:

$$P = W/A \quad (23)$$

Velocity required through jets:

$$V_j \sin\theta = KV, \quad V_j = KV/\sin\theta \quad (24)$$

Static pressure difference across jets:

$$V_j = 3400\sqrt{\Delta\phi}, \quad \Delta\phi = (V_j/3400)^2, \quad (25)$$

where $D_j \geq \frac{1}{4}$ in.

Static pressure in supply duct:

$$\phi = P + \Delta\phi \quad (26)$$

Jet diameter: From experimental results, it has been determined that a modifier is needed to fit the equation $F = \rho A_j (V_j \sin\theta - V)^2$ to actual conditions. This modifier $K_f$ has been found to equal 1.36 approximately. This changes the force equation to $$F = K_f \rho A_j (V_j \sin\theta - V)^2 \quad (27)$$

So $$A_j = F/K_f \rho (V_j \sin\theta - V)^2, \quad (28)$$

and $$D_j = 2(A_j/\pi)^{\frac{1}{2}} \quad (29)$$

Figure 11:
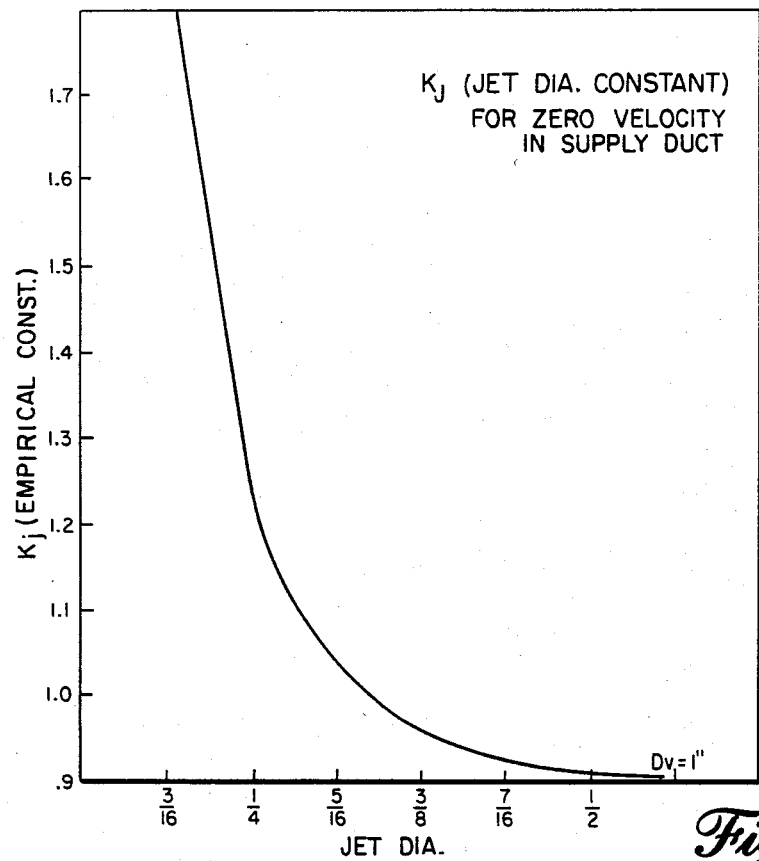
FIG. 11 is a graphical representation of the Jet Diameter Constant ($K_j$) for different jet diameters.

From experimental results it has been found that the velocity of the air through the jets is linear and holds to the relationship:

$$V_j = 3400\sqrt{\Delta\phi} \quad (3)$$

for jets ¼" or larger in diameter. But for jets less than ¼" in diameter, it is not linear; and, therefore, the equation must be modified to account for this. Refer to FIG. 11.

Example: Derivation of empirical pressure relationships between supply duct and can duct.

Since volume flow rate out of the can duct (Qout) equals the volume flow rate into the can duct (Qin), the following relationships hold:

$$Q_{in} = Q_{out}, \quad (11)$$

where $$Q_{in} = V_j A_j \quad (12)$$

$$Q_{out} = V_v A_v \quad (13)$$

$$V_j = 3400\sqrt{\Delta\phi} \quad (14)$$

$$V_v = 3400\sqrt{P}, \quad (15)$$

for holes greater than ¼" in diameter so $3400\sqrt{\Delta\phi} A_j N = 3400\sqrt{P} A_v$, where N = number of jets per vent and since $\Delta\phi = \phi - P$, $\sqrt{\phi - P} A_j N = \sqrt{P} A_v$ and $(\phi - P) A_j^2 N^2 = P A_v^2$ so $$P = N^2 A_j^2 \phi/(A_v^2 + N^2 A_j^2) \quad (30)$$

(Same as Equation 16 solved for $\phi$ rather than $\Delta\phi$).

It has been determined that 3 empirical constants are needed to modify this equation to fit test results. Those constants are $K_d$, $K_j$ and $K_v$. $K_d$ is a modifier for the diameters and is described by the relationship $$K_d = (D_v + D_j)/2D_j \tag{31}$$

Figure 12:
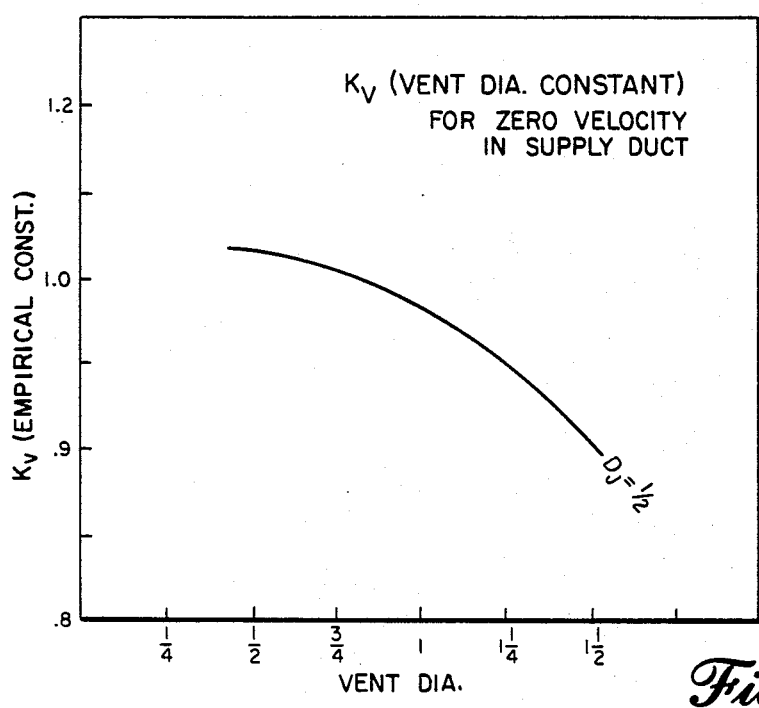
FIG. 12 is a graphical representation of the Vent Diameter Constant ($K_v$) for different vent diameters.

$K_j$ and $K_v$ are modifiers for the velocity of the air through the jet and vent respectively and can be determined from the graphs of FIGS. 11 and 12. Tables II through VII set forth the experimental determination of $K_j$ and Tables VIII through XII set forth the experimental determination of $K_v$.

So the pressure relationship equation becomes $$P = \frac{N^2 A_j^2 \phi K_d K_j K_v}{A_v^2 + N^2 A_j^2} \tag{32}$$

and solving for $A_v$, $$A_v = \left( \frac{K_d K_j K_v \phi - P}{P} \right)^{\frac{1}{2}} NA_j \tag{33}$$

And solving for $A_j$ $$A_j = \frac{A_v}{N} \left[ \frac{P}{(K_d K_j K_v \phi) - P} \right]^{\frac{1}{2}} \tag{34}$$

It must be remembered that in using these relationships they are not all linear through the full range of variables that can be expected.

Figure 13:
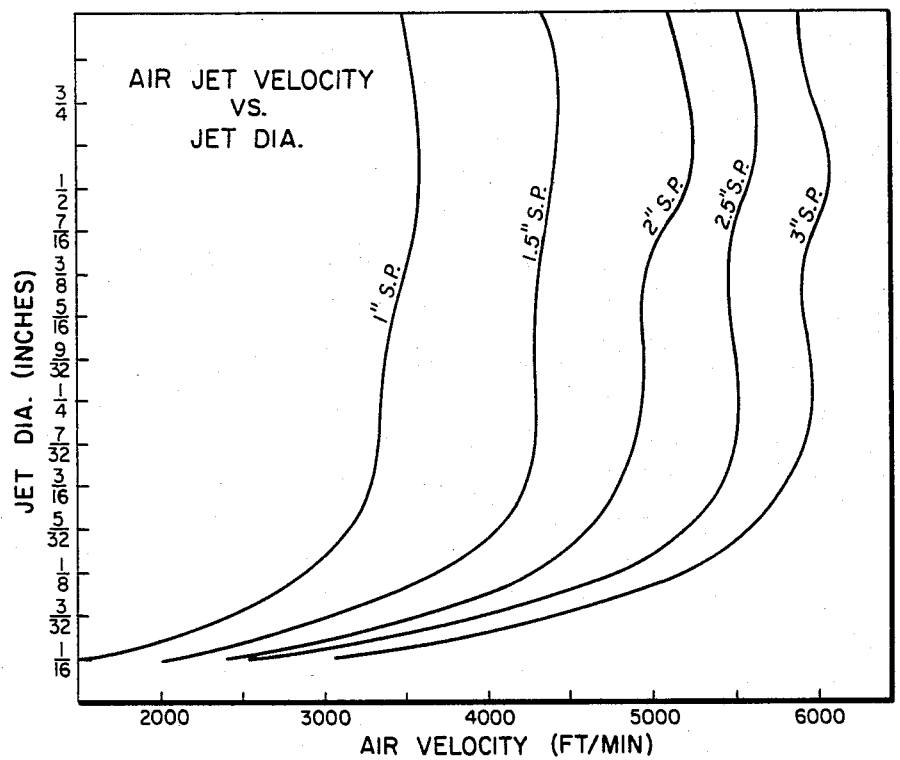
FIG. 13 is a graphical representation of the Air Jet Velocity vs Jet Diameters; and, FIG. 14 is a schematic representation of the forces acting on a can which are weight, w, force due to the air jets in a can duct, $F_1'$ and $F_2'$, and force due to pressure difference across the can $(P_1 - P_2) A$.

It is important to note that the velocity relationship $$V_j = 3400 \sqrt{\text{Static Pressure}} \tag{3}$$

is linear only for jet openings $\frac{1}{4}"$ or greater in diameter; for openings less than this, care must be used to determine the correct value. The correct value for jets less than $\frac{1}{4}"$ in diameter is obtained by multiplying the air velocity through the jet opening at 1" of water static pressure times the square root of the static pressure across the jet opening. Refer to the graphs of FIG. 13. Also, high supply duct velocities at low static pressure, i.e. 3000 ft/min or greater at less than 2" SP, should be avoided. This is an area of non-linearity and could produce large errors.

The forces acting on the can in the can duct are w, weight of can; $F_1'$ and $F_2'$, vertical components of force through the jets; and, $(P_1 - P_2)A$, the force due to pressure difference across the can, where $P_1$ and $P_2$ are the static pressures in the can duct and A is the cross sectional area of the can presented to the can duct.

The forces due to the jets are $$F = \dot{m}V_r \text{ where } \dot{m} = \rho V_r A_j \tag{6)(8}$$

$$\text{so } F = \rho V_r^2 A_j \tag{9}$$

Figure 14:
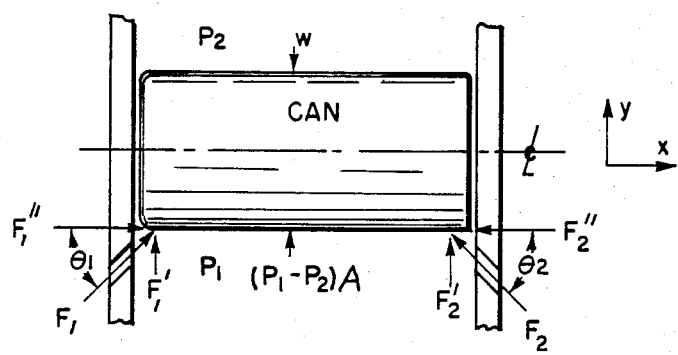

The total force along the y axis due to the jets, FIG. 14, is $$F_T = F_1' + F_2' = F_1 \sin\theta_1 + F_2 \sin\theta_2 \tag{35}$$

so $$F_T = \rho V_{r1}^2 A_{j1} \sin\theta_1 + \rho V_{r2}^2 A_{j2} \sin\theta_2 \tag{35A}$$

since $V_j = 3400\sqrt{\Delta\phi}$ $$F_T = \rho[(3400)^2 \Delta\phi_1 A_{j1} \sin\theta_1 + (3400)^2 \Delta\phi_2 A_{j2} \sin\theta_2] \tag{35B}$$

since the jets are normally of the same angle and size at both ends of the can, $A_{j1} \sin\theta_1 = A_{j2} \sin\theta_2$, thus the equation becomes $$F_T = 1.156 \times 10^7 \rho \sin\theta A_j(\Delta\phi_1 + \Delta\phi_2) \tag{35C}$$

which represents the force acting along the y axis on one can due to one set of jets.

Since the experiments referred to in Tables II and III used the force of the jets to just support the can weight, the system there described is solved for bodies at rest, e.g. $\Sigma Fy = 0$. Since the can duct 13 is open to ambient pressure $P_1$ and $P_2$ are approximately equal so the force due to static pressure across the can is negligible. Inserting $K_f$ as an empirical modifier.

$$w = 1.156 \times 10^7 K_f \rho \sin\theta A_j(\Delta\phi_1 + \Delta\phi_2)$$

TABLE II

EXAMPLE 1: Calculation of $K_f$ using experimental results, see FIG. 14
w = can weight = 20.8 Gm = .045864 lbf
$F_1$ = Force applied to open end of can,
$F_2$ = Force applied to closed end of can
$\phi_1 = 5"$ H$_2$O    $\phi_2 = 5.9"$ H$_2$O
$A_1 = .00077$ ft$^2$    $A_2 = .00077$ ft$^2$
$\theta = 45°$    $\theta = 45°$
Equation (36)    $F_1' + F_2' + 1.156 \times 10^7 K_f \rho A_j \sin\theta(\Delta\phi_1 + \Delta\phi_2)$
$\Sigma F = 0 = F_T - w, F_T = w$
$1.156 \times 10^7 K_f \rho \sin\theta A_j(\Delta\phi_1 + \Delta\phi_2) = .045864$ lb.
$(1.156 \times 10^7) K_f(5.253 \times 10^{-7})(.707) .00077(5 + 5.9) = .045864$
$.036033 K_f = .045864$
$K_f = 1.272829$

TABLE III

EXAMPLE 2: Calculation of $K_f$
w = can weight = 13.9 Gm = .0306495 lbf
$\phi_1 = 2.6$    $\phi_2 = 3.8$
$A_1 = .00077$ ft$^2$    $A_2 = .00077$ ft$^2$
$\theta_1 = 45°$    $\theta_2 = 45°$
$\Sigma F = 0$
(36)    $F_1' + F_2' = F_T = w$
$1.156 \times 10^7 K_f \rho \sin\theta A_j(\Delta\phi_1 + \Delta\phi_2) = .0306495$ lbf.
$(1.156 \times 10^7)(5.253 \times 10^{-7})(.707)(.00077)(2.6 + 3.8)K_f = .0306495$
$.02115706 K_f = .0306495$
$K_f = 1.4486653$ Average $K_f = \left( \frac{1.273 + 1.449}{2} \right) = 1.36$

TABLE IV

DETERMINATION OF $K_j$
Deadheaded - No velocity past Jets
Vent Diameter = 1"

| Jet Diameter | Measured $\phi$ | Measured Pm | Calc. Pc | (Pc) × (K$_d$) | K$_j$ |
|---|---|---|---|---|---|
| $\frac{1}{2}"$ | 7 | 1.9 | 1.39 | 2.09 | .909 |
| | 6 | 1.65 | 1.19 | 1.79 | .922 |
| | 5 | 1.35 | .997 | 1.49 | .906 |
| | 4 | 1.1 | .797 | 1.19 | .924 |
| | 3 | .85 | .598 | .897 | .947 |
| | 2 | .55 | .398 | .598 | .919 |
| | 1 | .28 | .199 | .299 | .936 |

TABLE IV-continued

DETERMINATION OF $K_j$
Deadheaded - No velocity past Jets
Vent Diameter = 1"

| Jet Diameter | Measured φ | Measured Pm | Calc. Pc | (Pc) × ($K_d$) | $K_j$ |
|---|---|---|---|---|---|
| | | | | $K_j$ Average = | .923 |

$$K_d = \frac{D_v + D_j}{2D_j} = 1.5$$

$$K_j = \frac{Pm}{(Pc) \times (K_d)}$$

φ & Pm are measured values of static pressure in supply duct and can duct respectively
Pc is the calculated value of Pm without empirical constants where $Pc = \frac{N^2 A_j^2 \phi}{A_v^2 + N^2 A_j^2}$

TABLE V

DETERMINATION OF $K_j$
Deadheaded - No velocity past Jets
Vent Diameter = 1"

| Jet Diameter | Measured φ | Measured Pm | Calc. Pc | (Pc) × ($K_d$) | $K_j$ |
|---|---|---|---|---|---|
| 7/16" | 7 | 1.35 | .896 | 1.472 | .917 |
| | 6 | 1.15 | .768 | 1.26 | .912 |
| | 5 | 1.0 | .640 | 1.05 | .952 |
| | 4 | .8 | .512 | .841 | .951 |
| | 3 | .6 | .384 | .631 | .950 |
| | 2 | .36 | .256 | .420 | .857 |
| | 1 | .18 | .128 | .210 | .857 |
| | | | | $K_j$ Average = | .913 |

$$K_d = \frac{D_v + D_j}{2D_j} = 1.643$$

$$K_j = \frac{Pm}{(Pc) \times (K_d)}$$

TABLE VI

DETERMINATION OF $K_j$
Deadheaded - No velocity past Jets
Vent Diameter = 1"

| Jet Diameter | Measured φ | Measured Pm | Calc. Pc | (Pc) × ($K_d$) | $K_j$ |
|---|---|---|---|---|---|
| ⅜" | 8 | 1 | .591 | 1.084 | .922 |
| | 7 | .95 | .518 | .948 | 1.002 |
| | 6 | .85 | .813 | .813 | 1.04 |
| | 5 | .75 | .677 | .677 | 1.10 |
| | 4 | .55 | .542 | .542 | 1.01 |
| | 3 | .4 | .406 | .406 | .985 |
| | 2 | .26 | .271 | .271 | .959 |
| | 1 | .12 | .1355 | .1355 | .88 |
| | | | | $K_j$ Average = | .987 |

$$K_d = \frac{D_v + D_j}{2D_j} = 1.833$$

$$K_j = \frac{Pm}{(Pc) \times (K_d)}$$

TABLE VII

DETERMINATION OF $K_j$
Deadheaded - No velocity past Jets
Vent Diameter = 1"

| Jet Diameter | Measured φ | Measured Pm | Calc. Pc | (Pc) × ($K_d$) | $K_j$ |
|---|---|---|---|---|---|
| 5/16" | 8 | .65 | .295 | .619 | 1.05 |
| | 7 | .55 | .258 | .542 | 1.01 |
| | 6 | .5 | .221 | .464 | 1.08 |
| | 5 | .4 | .84 | .387 | 1.03 |
| | 4 | .33 | .147 | .310 | 1.06 |
| | 3 | .25 | .110 | .232 | 1.07 |
| | 2 | .16 | .0737 | .1548 | 1.033 |
| | 1 | .07 | .0369 | .0773 | .906 |

TABLE VII-continued

DETERMINATION OF $K_j$
Deadheaded - No velocity past Jets
Vent Diameter = 1"

| Jet Diameter | Measured φ | Measured Pm | Calc. Pc | (Pc) × ($K_d$) | $K_j$ |
|---|---|---|---|---|---|
| | | | | $K_j$ Average = | 1.03 |

$$K_d = \frac{K_v + D_j}{2D_j} = 2.1$$

$$K_j = \frac{Pm}{(Pc) \times (K_d)}$$

TABLE VIII

DETERMINATION OF $K_j$
Deadheaded - No Velocity past Jets
Vent Diameter = 1"

| Jet Diameter | Measured φ | Measured Pm | Calc. Pc | (Pc) × ($K_d$) | $K_j$ |
|---|---|---|---|---|---|
| ¼" | 8 | .4 | .139 | .347 | 1.15 |
| | 7 | .36 | .108 | .269 | 1.33 |
| | 6 | .32 | .0925 | .231 | 1.38 |
| | 5 | .25 | .0771 | .193 | 1.30 |
| | 4 | .2 | .0616 | .154 | 1.29 |
| | 3 | .15 | .0463 | .116 | 1.29 |
| | 2 | .1 | .0308 | .077 | 1.29 |
| | 1 | .5 | .0154 | .0385 | 1.30 |
| | | | | $K_j$ Average = | 1.29 |

$$K_d = \frac{D_v + D_j}{2D_j} = 2.5$$

$$K_j = \frac{Pm}{(Pc) \times (K_d)}$$

TABLE IX

DETERMINATION OF $K_j$
Deadheaded - No velocity past Jets
Vent Diameter = 1"

| Jet Diameter | Measured φ | Measured Pm | Calc. Pc | (Pc) × ($K_d$) | $K_j$ |
|---|---|---|---|---|---|
| 3/16" | 8 | .25 | .0394 | .124 | 2.01 |
| | 7 | .22 | .0345 | .109 | 2.01 |
| | 6 | .19 | .0296 | .0936 | 2.03 |
| | 5 | .15 | .0246 | .078 | 1.92 |
| | 4 | .12 | .0197 | .0624 | 1.92 |
| | 3 | .085 | .0147 | .0468 | 1.82 |
| | 2 | .055 | .00985 | .0312 | 1.76 |
| | 1 | .025 | .0049 | .015 | 1.67 |
| | | | | $K_j$ Average = | 1.89 |

$$K_d = \frac{D_v + D_j}{2D_j} = 3.167$$

$$K_j = \frac{Pm}{(Pc) \times (K_d)}$$

TABLE X

DETERMINATION OF $K_v$
(Zero Velocity in Supply Duct)
Vent Diameter = 1½" $A_v$ = .0122 ft²

| Jet Diameter | Measured φ | Measured Pm | Caculated Pc | (Pc) × ($K_d$) | (Pc) × ($K_d$) × ($K_j$) | $K_v$ |
|---|---|---|---|---|---|---|
| ½" | 5 | .42 | .237 | .473 | .430 | .977 |
| $A_j$ = .00136 ft² | 4 | .325 | .189 | .378 | .344 | .945 |
| $K_j$ = .923 approx. | 3 | .24 | .142 | .284 | .258 | .930 |
| from graph FIG. | 2 | .16 | .0947 | .189 | .172 | .930 |
| 11 | 1 | .075 | .0473 | .0946 | .860 | .930 |
| | | | | | $K_v$ Average = | .942 |

$$K_d = \left(\frac{D_v + D_j}{2D_j}\right) = \frac{1.5 + .5}{2(.5)} = 2$$

$$K_v = \frac{Pm}{(Pc) \times (K_d) \times (K_j)}$$

TABLE XI

DETERMINATION OF $K_v$
(Zero Velocity in Supply Duct)
Vent Diameter = $1\frac{1}{4}''$ $A_v$ = .00852 ft$^2$

| Jet Diameter | Measured $\phi$ | Pm | Calc. Pc | (Pc) × ($K_d$) | (Pc) × ($K_d$) × ($K_j$) | $K_v$ |
|---|---|---|---|---|---|---|
| $\frac{1}{2}''$ | 5 | .7 | .462 | .809 | .738 | .948 |
| $A_j$ = .00136 ft$^2$ | 4 | .55 | .369 | .647 | .588 | .935 |
| | 3 | .39 | .277 | .485 | .441 | .884 |
| | 2 | .26 | .184 | .323 | .294 | .884 |
| | 1 | .13 | .09 | .162 | .147 | .884 |

$K_v$ Average = .907

$$K_d\left(\frac{D_v + D_j}{2D_j}\right) = \frac{1.25 + .5}{2(.5)} = 1.75$$

$$K_v = \frac{Pm}{(Pc) \times (K_d) \times (K_j)}$$

TABLE XII

DETERMINATION OF $K_v$
(Zero Velocity in Supply Duct)
Vent Diameter = 1'' $A_v$ = .00545 ft$^2$

| Jet Diameter | Measured $\phi$ | Pm | Calc. Pc | (Pc) × ($K_d$) | (Pc) × ($K_d$) × ($K_j$) | $K_v$ |
|---|---|---|---|---|---|---|
| $\frac{1}{2}''$ | 5 | 1.4 | .997 | 1.495 | 1.36 | 1.03 |
| $A_j$ = .00136 ft$^2$ | 4 | 1.1 | .798 | 1.197 | 1.089 | 1.01 |
| | 3 | .8 | .598 | .897 | .816 | .980 |
| | 2 | .55 | .398 | .597 | .542 | 1.01 |
| | 1 | .27 | .99 | .2985 | .272 | .992 |

$K_v$ Average = 1.004

$$K_d = \left(\frac{D_v + D_j}{2D_j}\right) = \frac{1 + .5}{2(.5)} = 1.5$$

$$K_v = \frac{Pm}{(Pc) \times (K_d) \times (K_j)}$$

TABLE XIII

DETERMINATION OF $K_v$
(Zero Velocity in Supply Duct)
Vent Diameter = $\frac{3}{4}''$ $A_v$ = .003068 ft$^2$

| Jet Diameter | Measured $\phi$ | Pm | Calc. Pc | (Pc) × ($K_d$) | (Pc) × ($K_d$) × ($K_j$) | $K_v$ |
|---|---|---|---|---|---|---|
| $\frac{1}{2}''$ | 5 | 2.6 | 2.20 | 2.75 | 2.50 | 1.04 |
| $A_j$ = .00136 ft$^2$ | 4 | 2.05 | 1.76 | 2.20 | 2.002 | 1.02 |
| | 3 | 1.5 | 1.32 | 1.65 | 1.50 | 1.0 |
| | 2 | 1.0 | .880 | 1.10 | 1.001 | 1.0 |
| | 1 | .5 | .440 | .550 | .5005 | 1.0 |

$K_v$ Average = 1.012

$$K_d = \left(\frac{D_v + D_j}{2D_j}\right) = \frac{.75 + .5}{2(.5)} = 1.25$$

$$K_v = \frac{Pm}{(Pc) \times (K_d) \times (K_j)}$$

TABLE XIV

DETERMINATION OF $K_v$
(Zero Velocity in Supply Duct)
Vent Diameter = $\frac{1}{2}''$ $A_v$ = .00136 ft$^2$

| Jet Diameter | Measured $\phi$ | P | Calc. P | (Pc) × ($K_d$) | (Pc) × ($K_d$) × ($K_v$) | $K_v$ |
|---|---|---|---|---|---|---|
| $\frac{1}{2}''$ | 5 | 4.1 | 4.0 | 4.0 | 3.64 | 1.127 |
| $A_j$ = .00136 ft$^2$ | 4 | 3.25 | 3.2 | 3.2 | 2.91 | 1.02 |
| | 3 | 2.4 | 2.4 | 2.4 | 2.184 | 1.10 |
| | 2 | 1.6 | 1.6 | 1.6 | 1.45 | 1.10 |
| | 1 | .80 | .80 | .80 | .728 | 1.10 |

TABLE XIV-continued

DETERMINATION OF $K_v$
(Zero Velocity in Supply Duct)
Vent Diameter = $\frac{1}{2}''$ $A_v$ = .00136 ft$^2$

| Jet Diameter | Measured $\phi$ | P | Calc. P | (Pc) × ($K_d$) | (Pc) × ($K_d$) × ($K_v$) | $K_v$ |
|---|---|---|---|---|---|---|

$K_v$ Average = 1.11

$$K_d = \left(\frac{D_v + D_j}{2D_j}\right) = \frac{.5 + .5}{2(.5)} = 1.00$$

$$K_v = \frac{Pm}{(Pc) \times (K_d) \times (K_j)}$$

Using the above relationships, a design of an elevator in accordance with the present invention is hereinafter illustrated.

A. Basic Requirements
1. 1000 cans per minute
2. 6'' spacing on centerline of cans
3. Elevator height 10 ft.—Discharge 1.6 ft.
4. Can duct static pressure at inlet=0.4 in. H$_2$O maximum B. Basic Assumptions
1. $V_j \sin \theta = 7$ V at inlet
2. Jet on $1\frac{1}{2}''$ centers
3. Vents on $1\frac{1}{2}''$ centers
4. 3 jets act on each can end to give lifting force on can
5. Assume $\theta$ at inlet=45°, and maximum $\theta \leq 60°$ C. Calculation of force required to maintain velocity (Assume cans are moving on frictionless horizontal plane)

$$F = \dot{M} \times V, \dot{M} = \frac{W}{gt}, \text{ where weight of 1 can} = .03116 \text{ lbf}$$

$$\dot{M} = \frac{1000 \text{ cans}}{\text{min}} \times \frac{.03116 \text{ lbf}}{\text{can}} \times \frac{1 \text{ sec}^2}{32.2 \text{ ft}} \times \frac{1 \text{ min}^2}{3600 \text{ sec}^2}$$

$$\dot{M} = .0002689 \frac{1 \text{ lbf-min}}{\text{ft}}$$

$$V = \frac{1000 \text{ can}}{\text{min}} \times \frac{.5 \text{ ft}}{\text{can}} = \frac{500 \text{ ft}}{\text{min}}$$

$$F = \dot{M}V = \frac{.0002689 \text{ lbf} - \text{min}}{\text{ft}} \times \frac{500 \text{ ft.}}{\text{min}}$$

$$F = .13445 \text{ lbf}$$

This is force required to maintain velocity. This force must be imparted to the cans through all jets acting on the cans.

D. Calculation of number of cans in the elevator and discharge at one time.

11.6 ft. × 1 can/0.5 ft=23.2 cans

E. Calculation of force exerted on the column due to the static pressure in can duct. If P=0.4 in. H$_2$O and 1 in. H$_2$O=5.328 lbf/ft$^2$ and cross sectional area of a #209-12 oz. can is 0.09115 ft$^2$, the force exerted is:

$$F = PA = .4 \text{ in. H}_2\text{O} \times \frac{5.328 \text{ lbf/ft}^2}{1 \text{ in. H}_2\text{O}} \times .09115 \text{ ft}^2$$

$$F = .19425 \text{ lbf}$$

F. Calculation of weight of all cans in elevator at one time. Each can weighs 0.03116 lbf so the total weight of the column is:

$$W = 23.2 \text{ cans} \times 0.03116 \text{ lbf/can} = 0.7229 \text{ lbf}$$

G. Calculation of Force that must be supplied through all jets to support all cans in the can duct. Cans weight=0.7229 lbf. Force due to static pressure in can duct=0.19425 lbf. Therefore, the force the jets must supply to support that portion of weight not already supported by the static pressure between the cans is:

$$F = 0.7229 - 0.19425 = 0.5287 \text{ lbf}$$

H. Calculation of number of jets acting on the cans. Since six jet total act on each can:

$$23.2 \text{ cans} \times 6 \text{ jets/can} = 139.2 \text{ jets}$$

I. Calculation of effective weight of cans. With 23.2 cans supported by a force of 0.19425 lbf, the effective weight of each can is:

$$0.19425 \text{ lbf}/23.2 \text{ can} = 0.0083728 \text{ lbf/can}$$

J. Calculation of total force required through the jets. Force to maintain velocity is=0.13445 lbf distributed among the 139.2 jets acting on the cans, this is $$0.13445 \text{ lbf}/139.2 \text{ jets} = 0.0009659 \text{ lbf/jet}$$

Force to lift required weight is=0.5287 lbf distributed among the 139.2 jets is 0.5287 lbf/139.2 jets=0.003797 lbf/jet, so the total force thru each jet is 0.003797+0.0009659=0.004763 lbf/jet.

K. Calculation of inlet conditions.
1. Assume $V_j \sin \theta = 7 V$ at inlet, $V = 500$ ft/min so $V_j \sin \theta = 7(500 \text{ ft/min}) = 3500$ ft/min. Assume $\theta = 45°$, $V_j = 3500/\sin 45° = 4949.7$ ft/min $\Delta\phi$ to give this velocity is $V_j = 3400\sqrt{\Delta\phi}$ $$\Delta\phi = \left(\frac{V_j}{3400}\right)^2 = \left(\frac{4949.7}{3400}\right)^2 = 2.12 \text{ in. H}_2\text{O static pressure}$$

$$\phi = P + \Delta\phi = .4 + 2.12 = 2.52 \text{ in H}_2\text{O static pressure}$$

(K) $F = K_f \rho A_j (V_j \sin\theta - V)^2$, where $K_f = 1.36$, reference Table III $$A_j = \frac{F}{K_f \rho (V_j \sin\theta - V)^2}$$

$A_j =$ $$\frac{.004763 \text{ lbf/jet}}{(1.36)(5.2536 \times 10^{-7})(\text{lbf}-\text{min}^2)/\text{ft}^4 (3500-500)^2 \text{ ft}^2/\text{min}^2}$$
$$= .0007353 \text{ ft}^2/\text{jet}$$

$$A_j = .1059 \text{ in.}^2, D_j = 2\left(\frac{A}{\pi}\right)^{\frac{1}{2}} = .367 \text{ in. diameter}$$

$$A_v = \left(\frac{K_d K_j K_v \phi - P}{P}\right)^{\frac{1}{2}} NA_j, \text{ but } K_d \text{ and } K_v \text{ are both functions of } A_v, \text{ so the solution is most easily found by trial and error as follows:}$$

Trial 1 Approximate $A_v = \left(\frac{\phi - P}{P}\right)^{\frac{1}{2}} NA_j =$ $$\left(\frac{2.52 - .4}{.4}\right)^{\frac{1}{2}} 2(.1059 \text{ in.}^2) = .4876 \text{ in.}^2$$

Since $A_v = .4876 \text{ in.}^2$, $D_v = .788$ in. diameter

Trial 2 at $D_v = .788$ in., $K_d = \frac{D_v + D_j}{2D_j} = \frac{.788 + .367}{2(.367)} = 1.57$ From Graph FIG. 11, $K_j = .96$ and from FIG. 12, $K_v = 1.0$ $$A_v = \left(\frac{K_d K_j K_v \phi - P}{P}\right)^{\frac{1}{2}} NA_j$$

$$A_v = \left(\frac{(1.57)(.96)(1.0)(2.52) - .4}{.4}\right)^{\frac{1}{2}} (2)(.1059)$$

$A_v = .617 \text{ in.}^2$, $D_v = .887$ in. diameter

Trial 3 At $D_v = .887$ in., $K_d = \frac{D_v + D_j}{2D_j} = \frac{.887 + .367}{2(.367)} = 1.71$ So $A_v = \left(\frac{(1.71)(.96)(1.0)(2.52) - .4}{.4}\right)^{\frac{1}{2}} (2)(.1059)$ $A_v = .647 \text{ in.}^2$, $D_v = .907$ in. diameter Trial 4 At $D_v = .907$ in., $K_d = \frac{.907 + .367}{2(.367)} = 1.73$ $$A_v = \left(\frac{(1.73)(.96)(1.0)(2.52) - .4}{.4}\right)^{\frac{1}{2}} (2)(.1059)$$

$A_v = .6527 \text{ in.}^2$, $D_v = .912$ in. diameter
and since this diameter at Trial 4 varies only .005 with the diameter at Trial 3, it can be considered sufficiently accurate to end the trial and error solution here.

L. Calculation of conditions at 2 ft. At 2 ft. there are 9.6 ft. of can column above so there are 9.6 ft×1 can/0.5 ft=19.2 cans in elevator. The effective weight of this column is: 19.2 cans×0.0083728 lbf/can=0.160758 lbf With a cross sectional area of 0.092115 ft², the can duct static pressure is: 0.160758 lbf/0.09115 ft²=1.7637 lbf/ft²

$$1.7637 \frac{\text{lbf}}{\text{ft}^2} \times \frac{1 \text{ in. H}_2\text{O}}{5.328 \frac{\text{lbf}}{\text{ft}^2}} = .331 \text{ in. H}_2\text{O} = P$$

so $P = .331$ in. H$_2$O at 2 ft.

Since $\phi = 2.52$ in. H$_2$O, $\Delta\phi = \phi - P = 2.52 - .331 = 2.189$

So $V_j = 3400 \sqrt{2.189} = 5030.4$ ft/min

Since $D_v = .912$ in., $$A_v = .6527 \text{ in.}^2, A_j = \frac{A_v}{N}\left[\frac{P}{(K_d K_j K_v \phi) - P}\right]^{\frac{1}{2}}$$

Trial 1 $A_j$ approximately $= \frac{A_v}{N}\left(\frac{P}{\phi - P}\right)^{\frac{1}{2}}$ -continued $$A_j = \frac{.6527 \text{ in.}^2}{2}\left(\frac{.331}{2.52 - .331}\right)^{\frac{1}{2}} = .1269 \text{ in.}^2$$

$A_j = .1269 \text{ in.}^2 \cdot D_j = .402 \text{ in.}$

Trial 2 At $D_j = .402$ in. and $D_v = .912$ in.

$$K_d = \frac{D_v + D_j}{2D_j} = \frac{.912 + .402}{2(.402)} = 1.63$$

From Graphs FIGS. 11 and 12, $K_j = .95$, $K_v = .99$

So $A_j = \frac{.6527 \text{ in.}^2}{2}\left[\frac{.331}{(1.63)(.95)(.99)(2.52) - .331}\right]^{\frac{1}{2}}$ $A_j = .0999 \text{ in.}^2$, $D_j = .357$ in. diameter (L) Trial 3 At $D_J = .357$ in., $$K_d = \frac{D_v + D_j}{2D_j} = \frac{.912 + .357}{2(.357)} = 1.78$$

$K_j = (.97)$ and $K_v = (.99)$ from FIGS. 11 and 12 so $A_j = \frac{.6527 \text{ in.}^2}{2}\left[\frac{.331}{(1.78)(.97)(.99)(2.52) - .331}\right]^{\frac{1}{2}}$ $A_j = .0953 \text{ in.}^2$, $D_j = .348$ in. diameter Since this varies only 0.009 in. with the preceding value of $D_j$, we will assume this value to be sufficiently accurate.

$$F = K_j \rho A_j (V_j \sin\theta - V)^2$$

so $\theta = \sin^{-1}\left[\frac{(F/K_j\rho A_j)^{\frac{1}{2}} + V}{V_j}\right]$ so $\theta =$ $$\sin^{-1}\left[\frac{((.004763)/[(1.36)(5.2536 \times 10^{-7})(.000662)])^{\frac{1}{2}} + 500}{4949.7}\right]$$

$\theta = 47.9°$

M. Calculation of conditions at 4 ft. At 4 ft. there are 7.6 ft. of column above so there are: $7.6 \times 1$ can/0.5 ft = 15.2 cans in the elevator above the 4 ft. mark. The effective weight of the column is $15.2 \times 0.0083728$ lbf = 1.27267 lbf. With cross-sectional area = 0.09115 ft.², the can duct static pressure is:

$.127267$ lbf$/.09115$ ft.² $= 1.3962$ lbf/ft.²

$1.3962 \frac{\text{lbf}}{\text{ft}^2} \times \frac{1 \text{ in. H}_2\text{O}}{5.328 \frac{\text{lbf}}{\text{ft}^2}} = .262$ in. H$_2$O So $P = .262$ in. H$_2$O at the 4 ft. elevation Since $\phi = 2.52$, $\Delta\phi = \phi - P = 2.52 - .262 = 2.258$ in. H$_2$O $V_j\ 3400\ \sqrt{\Delta\phi} = 3400\ \sqrt{2.258} = 5109.1$ ft/min Since $D_v = .912$ in., $A_v = .6527$ in.²

-continued $$A_j = \frac{A_v}{N}\left[\frac{P}{K_dK_jK_v\phi - P}\right]^{\frac{1}{2}}$$

(M) Trial 1 $A_j$ approximately =

$$\frac{A_v}{N}\left(\frac{P}{\phi - P}\right)^{\frac{1}{2}} = \frac{.6525 \text{ in.}^2}{2}\left[\frac{.262}{2.52 - 2.62}\right]^{\frac{1}{2}}$$

$A_j = .1111$ in.², $D_j = .376$ in. diameter

Trial 2 At $D_j = .376$ in., $K_d = \frac{D_v + D_j}{2D_j} = \frac{.912 + .376}{2(.376)} = 1.71$ From Graphs FIGS. 11 and 12, $K_j = (.96)$ and $K_v = (1)$ approximately $$A_j = \frac{.6525 \text{ in.}^2}{2}\left[\frac{.262}{(1.71)(.96)(1)(2.52) - .262}\right]^{\frac{1}{2}}$$

$A_j = .084756$ in.², $D_j = .3285$ in. diameter

Trial 3 At $D_j = .3285$ in., $K_d = \frac{D_v + D_j}{2D_j} = \frac{.912 + 3285}{2(.3285)} = 1.89$ From Graphs FIGS. 11 and 12, $K_j = 1.02$ and $K_v = 1.0$ $$A_j = \frac{.6525 \text{ in.}^2}{2}\left[\frac{.262}{(1.89)(.102)(1)(2.52) - .262}\right]^{\frac{1}{2}}$$

$A_j = .0779$ in.², $D_j = .315$ in. diameter

Since this is only 0.014 from the preceding Trial, one can consider this value sufficiently accurate.

$$F = K_j\rho A_j(V_j\sin\theta - V)^2$$

so $\theta = \sin^{-1}\left[\frac{(F/K_j\rho A_j)^{\frac{1}{2}} + V}{V_j}\right]$ so $\theta =$ $$\sin^{-1}\left[\frac{((.004763)/[(1.36)(5.2536\times 10^{-7})(5.4097\times 10^{-4})])^{\frac{1}{2}} + 500}{5109.1}\right]$$

$\theta = 51.7°$

N. Calculation of conditions at 6 ft. At 6 ft. there are 5.6 ft. of column above so there are: $5.6 \times 1$ can/0.5 ft = 11.2 cans in the elevator above the 6 ft. mark The effective weight of this column is $11.2 \times 0.0083778$ lbf = 0.09377536 lbf With cross-sectional area = 0.09115 ft.², the can duct static pressure is:

(N) $.09377536/.09115$ ft² $= 1.0288$ lbf/ft², $1.0288 \frac{\text{lbf}}{\text{ft}^2} \times$ $\frac{1 \text{ in. H}_2\text{O}}{5.378^2 \frac{\text{lbf}}{\text{ft}^2}} = .19309$ in. H$_2$O so $P = .1931$ in. H$_2$O
$\Delta\phi = \phi - P = 2.52 - .1931 = 2.3269$ in. H$_2$O $V_j = 3400\ \sqrt{\Delta\phi} = 3400\ \sqrt{2.3269} = 5186.4$ ft/min Since $D_v = .912$, $A_v = .6527$ in.², $A_j = \frac{A_v}{N}\left(\frac{P}{K_dK_jK_v\phi - P}\right)^{\frac{1}{2}}$ Trial 1 $A_j$ approximately $= \frac{A_v}{N} \left( \frac{P}{\phi - P} \right)^{\frac{1}{2}}$ $A_j = \frac{.6527}{2} \left( \frac{.1931}{2.52 - .1931} \right)^{\frac{1}{2}} = .0940$ $D_j = .346$ in.

Trial 2 At $D_j = .346$ in., $K_d = \frac{D_v + D_j}{2D_j} = \frac{.912 + .346}{2(.346)} = 1.82$ From Graphs FIGS. 11 and 12, $K_j = (.102)$, $K_v = (1.0)$ approx.

$A_j = \frac{.6527}{2} \left( \frac{.1931}{(1.82)(1.02)(1.0)(2.52) - .1931} \right)^{\frac{1}{2}} = .06776$ in.$^2$ $D_j = .294$ in.

Trial 3 At $D_j = .294$ in., $K_d = \left( \frac{.912 + .294}{2(.294)} \right) = 2.05$ From Graphs FIGS. 11 and 12, $K_j = (1.05)$, $K_v = (1.0)$ $A_j = \frac{.6527}{2} \left( \frac{.1931}{(2.05)(1.05)(1.0)(2.52) - .1931} \right)^{\frac{1}{2}}$ $A_j = .06268$ in.$^2$, $D_j = .283$ in.

Since this varies only 0.011 with the last value one can consider this sufficiently accurate.

$F = K_f \rho A_j (V_j \sin\theta - V)^2$ so $\theta = \sin^{-1}\left[ \frac{(F/K_f \rho A_j)^{\frac{1}{2}} + V}{V_j} \right]$ $\theta =$ $\sin^{-1}\left[ \frac{((.004763/[(1.36)(5.2536 \times 10^{-7})(4.353 \times 10^{-4})])^{\frac{1}{2}} + 500}{5186.4} \right]$ $\theta = 58.3°$ (N) Due to design considerations, jet angles above 60° are undesirable. Therefore, in the calculations of conditions at 8 ft. and above, the jet diameter and angle will remain at approximately 0.283 inches (adjusting only for the changes in $\Delta\phi$) and 58.3°, to give the correct force needed to maintain the can velocity. The outlet vent diameter will increase to give the proper pressure ratio between the supply duct and can duct.

O. Calculation of conditions at 8 ft. At 8 ft. there are 3.6 ft. of column above so there are:

$3.6 \times 1$ can$/0.5$ ft $= 7.2$ cans above the 8 ft. mark

The effective weight of these cans is 7.2 cans $\times$ 0.00837728 lbf $=$ 0.06031584 lbf With a cross-sectional area of 0.09115 ft$^2$ the can duct static pressure is:

$.06031584$ lbf$/.09115$ ft$^2 = .6617 \frac{\text{lbf}}{\text{ft}^2}$ $.6617 \frac{\text{lbf}}{\text{ft}^2} \times \frac{1 \text{ in. H}_2\text{O}}{5.328 \frac{\text{lbf}}{\text{ft}^2}} = .124$ in. H$_2$O so $P = .124$ in. H$_2$O
$\Delta\phi = \phi - P = 2.52 - .124 = 2.396$ in. H$_2$O $V_j = 3400 \frac{\text{ft}}{\text{min}} \sqrt{\Delta\phi} = 3400 \sqrt{2.396} = 5262.9 \frac{\text{ft}}{\text{min}}$ $F = K_f \rho A_j (V_j \sin\theta - V)^2$ $A_j = \frac{F}{K_f \rho (V_j \sin\theta - V)^2}$ $A_j = \frac{.004763}{(1.36)(5.2536 \times 10^{-7})[(5262.9 \sin 58.3°) - 500]^2}$ $A_j = .000421$ ft$^2 = .060624$ in.$^2$, $D_j = .278$ in.

$A_v = \left( \frac{K_d K_j K_v \phi - P}{P} \right)^{\frac{1}{2}} NA_j$ (O) Trial 1 $A_v$ Approximately $= \left( \frac{\phi - P}{P} \right)^{\frac{1}{2}} NA_j$ $A_v = \left( \frac{2.52 - .124}{.124} \right)^{\frac{1}{2}} (2)(.060624) = .5330$ in.$^2$ $D_v = .8234$ in. diameter Trial 2 $A_v = \left( \frac{K_d K_j K_v \phi - P}{P} \right)^{\frac{1}{2}} NA_j$ At $D_v = .8234$ in., $K_d = \frac{D_v + D_j}{2D_j} = \frac{.8234 + .278}{2(.278)} = 1.98$ From Graphs FIGS. 11 and 12, $K_j = (1.15)$, $K_v = (1.0)$ approx.

$A_v = \left( \frac{(1.98)(1.15)(1.0)(2.52) - (.124)}{(.124)} \right)^{\frac{1}{2}} (2)(.060624)$ $A_v = .816$ in.$^2$, $D_v = 1.02$ in.

Trial 3 At $D_v = 1.02$, $K_d = \frac{D_v + D_j}{2D_j} = \frac{1.02 + .278}{2(.278)} = 2.33$ From Graphs FIGS. 11 and 12, $K_j = (1.15)$, $K_v = (.98)$ $A_v = \left( \frac{(2.33)(1.15)(.98)(2.52) - (.124)}{(.124)} \right)^{\frac{1}{2}} (2)(.060624)$ $A_v = .87806$ in.$^2$, $D_v = 1.05$ in.

Trial 4 At $D_v = 1.05$ in., $K_d = \frac{1.05 + .278}{2(.278)} = 2.40$

From Graphs FIGS. 11 and 12, $K_j = 1.15$, $K_v = (.98)$ $A_v = \left( \frac{(.240)(1.15)(.98)(2.52) - (.124)}{(.124)} \right)^{\frac{1}{2}} (2)(.060624)$ $A_v = .891$ in.$^2$, $D_v = 1.065$ in.

Since this diameter is within 0.015 of the last Trial, it can be considered sufficiently accurate.

P. Calculation of conditions at 10 ft. At 10 ft. there are 1.6 ft. of equivalent height left in discharge elbow. At 0.5 ft. per can there are 1.6 ft × 1 can/0.5 ft = 3.2 cans in the elevator above this point. Since the effective weight of the can is 0.0883728 lbf, the effective column weight is: (3.2) (0.0083728) = 0.02679 lbf. With cross-sectional area of can = 0.09115 ft², this will require a can duct static pressure of: 0.02679 lbf/0.09115 ft² = 0.2939 lbf/ft²

$$(P)\ 2.939\ \frac{lbf}{ft^2} \times \frac{1\ in.\ H_2O}{5.328\ \frac{lbf}{ft^2}} = .05517\ in.\ H_2O$$

so $P = .05517$ in. $H_2O$
$\Delta\phi = \phi - P = 2.52 - .05517 = 2.46$ in. $H_2O$ $$V_j = 3400\ \frac{ft}{min}\ \sqrt{\Delta\phi} = 3400\ \sqrt{2.46} = 5337.9\ \frac{ft}{min}$$

$$F = K_j \rho A_j (V_j \sin\theta - V)^2$$

$$A_j = \frac{F}{K_j \rho (V_j \sin\theta - V)^2}, A_j =$$

$$\frac{.004763}{(1.36)(5.2536 \times 10^{-7})[(5337.9\ \sin 58.3°) - 500]^2}$$

$A_j = .000408$ ft² $= .05877$ in.², $D_j = .273$ in.

$$A_v = \left(\frac{K_d K_j K_v \phi - P}{P}\right)^{\frac{1}{2}} NA_j$$

Trial 1 $A_v$ approximately $= \left(\frac{\phi - P}{P}\right)^{\frac{1}{2}} NA_j =$ $$\left(\frac{2.52 - .05517}{.05517}\right)^{\frac{1}{2}} (2)(.05877)$$

$A_v = .78564$ in.², $D_v = 1.000$ in.

Trial 2 At $D_v = 1.000$, $K_d = \frac{1 + .273}{2(.273)} = 2.33$

From Graphs FIGS. 11 and 12, $K_j = (1.2)$, $K_v = (.99)$ $$A_v = \left(\frac{(2.33)(1.2)(.99)(2.52) - .5517}{.05517}\right)^{\frac{1}{2}} (2)(05877) = 1.32\ in.^2$$

$D_v = 1.29$ in.

Trial 3 At $D_v = 1.29$, $K_d = \frac{1.29 + .273}{2(.273)} = 2.87$

From Graphs FIGS. 11 and 12, $K_j = (1.2)$, $K_v = (.94)$ $$A_v = \left(\frac{(2.87)(1.2)(.94)(2.52) - .05517}{.05517}\right)^{\frac{1}{2}} (2)(.05877)$$

$A_v = 1.425$ in.², $D_v = 1.347$ in.

-continued

Trial 4 At $D_v = 1.35$, $K_d = \frac{1.35 + .273}{2(.273)} = 2.97$

From Graphs FIGS. 11 and 12, $K_j = (1.2)$, $K_v = (.94)$ $$A_v = \left(\frac{(2.97)(1.2)(.94)(2.52) - .05517}{.05517}\right)^{\frac{1}{2}} (2)(.05877)$$

$A_v = 1.44$ in.², $D_v = 1.358$ in.

(P) Since this varies only 0.009 with the previous Trial diameter, it can be considered sufficiently accurate.

Therefore, one solution to the elevator design fulfilling the basic requirements described above is set forth on TABLE XV as follows:

TABLE XV

| | ELEVATOR DESIGN PARAMETERS | | | | | |
|---|---|---|---|---|---|---|
| Elevation | P (In. H₂O) | φ (In. H₂O) | $D_j$ (inches) | $D_v$ (inches) | θ (degrees) | Velocity Ratio |
| 10 ft. | .05517 | 2.52 | .273 | 1.358 | 58.3° | 9.1 to 1 |
| 8 ft. | .124 | 2.52 | .278 | 1.065 | 58.3° | 8.96 to 1 |
| 6 ft. | .1931 | 2.52 | .283 | .912 | 58.3° | 8.83 to 1 |
| 4 ft. | .262 | 2.52 | .315 | .912 | 51.7° | 8.02 to 1 |
| 2 ft. | .331 | 2.52 | .348 | .912 | 47.9° | 7.35 to 1 |
| Inlet | .400 | 2.52 | .367 | .912 | 45° | 7 to 1 |

The spacing of the cans is established at the feed or inlet end of the elevator and may suitably be established by the in-feed of this invention. The air elevator in and of itself has no provision for establishing the spacing between cans. This function is provided by the in-feeder generally identified by reference numeral 60 and roughly extending from point A to point B. The in-feeder 60 is usually a slight bit more than a 90° bend but need not be. The can duct 18a of the in-feeder is very similar to the can duct 18 of the elevator with the exception of the absence of multiple exhaust openings. Air is introduced into the can duct 18a through jets 51a and 52a from the air supply duct 24a which may be an extension of duct 24 or be separate and provided with a separate fan or blower. A sliding damper 62 is provided on the inside side or enclosure 30a just before and adjacent the juncture of the in-feed 60 with the vertical elevator 10 at point B. The sliding damper 62 serves to open or close an opening 64 in the side or enclosure 30a. The cans 12a coming into the inlet 66 of the in-feeder 60 are either under mechanical, gravity or air pressure as where the jet boards 54a and 55a extend to the right in FIG. 2 beyond the can duct enclosures 28a and 30a. A force must be applied to the cans to move them into the in-feeder since the air being introduced into the in-feeder can duct 18a tends to produce a back pressure therein and acts to push to the right in FIG. 2 and prevent cans 12a from entering the in-feeder can duct 18a. As cans 12a are pushed into the in-feeder can duct 18a against the air pressure, the cans 12a will progress up the in-feed to a point 66 just prior to the opening 64 and as a can passes this point, the air pressure between this can and the previous can will propel the can at point 66 forward, with the air ahead of this can escaping through opening 64 thus providing a spacing 67 between cans entering the elevator 10 the size of which depends upon the positioning of damper 62. The greater the opening 64, the greater the volume of air that is allowed to escape through opening 64 by the positioning of damper 62, and the closer the cans are spaced for introduction into the elevator 10. The volume of air, CFM, injected into the elevator 10 and the static pressure produced are such as to maintain the selected spacing of the cans 12.

At the output 68 of the elevator 10 at point C, it is usually desirable to feed the elevated cans at a slower rate and more nearly in can-to-can contact to a work station 70 and the like. To accomplish this transition, there may be provided a de-accelerator 72 having an inlet 74 connected to receive cans from the outlet 68 of elevator 10, and an outlet 76. The de-accelerator 72 comprises a can duct 18b made up of ends 20b and 22b each having jets 51b and 52b therein or in jet boards 54b and 55b similar to that previously explained with regard to elevator 10. The ends 20b and 22b may form a common wall between the can duct 18b and air supply ducts 24b and 26b. For at least the central portion of the de-accelerator 72, there are provided a greater number of jets 51b and 52b which are considerably closer together than those of the elevator 10 (see FIG. 5). This arrangement of jet holes permits a much higher volume of air to be introduced in the active portion of the de-accelerator and provides a barrier or cushion of air such that the cans 12b are permitted to close upon one another to effectively provide a braking effect on the cans 12 exiting the outlet 68 of elevator prior to their reaching the outlet 76 of the de-accelerator 72 and arriving at the work station 70. It will be noted that the jet holes 51b and 52b are essentially twice in number and thus introduce twice the volume of air compared to those of the elevator to provide an increased amount of air introduced within the active area. The active area is defined as about 15° to either side of the bisector of the included angle of discharge. The maximum bisector angle is no greater than 45° although the discharge angle may exceed 90°. The angle of the jets in this portion may be reduced also to reduce the forward speed of the cans.

The conveyor 73, shown dashed in FIG. 1, and as set forth in FIG. 7, comprises a different embodiment known as a fan wherein the curvature of the can duct is at 90° with respect to the can duct of the de-accelerator 72 such that the cans 12c are moved in a fan pattern such that the axis 78 of the can is rotated about a point 80 along its length to present the cans 12c in an upright position to the work station 70c which may be a horizontal elevator or transfer unit 82. Since the air jets in the fan, once the cans have moved through about 45°, will have less gravity to overcome, the jets beyond about 45° may be fewer in number and/or smaller. It is important, however, that the cans be maintained in a proper position such that the trailing edge of the open end contacts the outer radius of the fan to avoid excessive elongation of the can. The jets are positioned and adjusted to slightly tip the open end 14d of the cans in the direction of travel to avoid contact of the leading edge with the can duct. This is the case also where the open end of the can is positioned downwardly.

Referring to FIG. 7, the transfer unit 82 is quite similar in construction to the vertical elevator 10 in that there is provided a can duct 18d positioned to transport the can 12d with its axis of rotation positioned vertically. The can duct 18d is formed with ends 20d and 22d provided with jets 52d and 53d therein or in jet boards 54d and 55d. Air supply ducts 24d and 26d are connected to suitable air supplies which supply air to the ducts and via jets 52d and 53d to the can duct 18d. The sides 28d and 30d may each be provided with a series of spaced exhaust holes 31d and 33d to provide and maintain a positive static pressure with respect to the ambient atmosphere between articles in the article conveyor duct. Again, the size and positioning of the jets should be such that the open end of cans 12d are tilted slightly in the direction of travel.

In an embodiment of FIGS. 1 and 2 wherein the jets 51 and 52 of the elevator 10 are of the same size throughout the height thereof, the spacing established between cans 12 by the in-feed 60 is maintained by introducing air into the space 22 and exhausting the air through exhaust openings 31 such as to maintain a positive static pressure within the space between the cans. Where the amount of air introduced in one portion of the elevator is greater or less than that introduced into another, the spacing between the cans may be varied as the cans traverse the length of the elevator. For example, if the size of the jet openings were increased, at the same supply static pressure, in relation to height of the elevator, the greater amount of air introduced between cans would tend to cause the cans to separate still further as they progress up the elevator. Conversely, if the jets were reduced in size, with the same supply static pressure, the spacing between the cans would diminish as they progress up the elevator. The same phenomenon would be observed where the jet sizes were held constant and the supply static pressure were increased or decreased with respect to the height of the elevator.

Referring now to FIG. 6, there is shown in cross section to an enlarged scale, a length of the jet board 152a having a series of apertures 154 therein adapted to receive a nozzle 156 having a spherical ball 158 permitting angular movement of the nozzle within the jet board. An actuator board 160 is slidably attached to the jet board 152a and receives through a series of apertures therein one extremity of each of the nozzles 156 such that on sliding movement of the actuator 160 all of the nozzles are movable. Such an arrangement provides for selectively adjusting the angle of nozzles 156 as desired or automatically as by being under control of a computer and the like.

What is claimed is:

1. A method of vertically and serially transporting cylindrical articles which rotate along their longitudinal axis, said method comprising:

providing a conduit with a wall structure having a rectangular cross-section with spaced side walls and spaced end walls having dimensions just slightly greater than the profile of the articles to provide an effective air seal between adjacent air spaces formed between adjacent articles, the conduit having an inlet end and an outlet end, the inlet end being lower than the outlet end;

introducing the articles into the inlet end of the conduit at predetermined-spaced intervals, the longitudinal axes of said articles being in a generally horizontal orientation;

injecting air as jets into the conduit through the end walls along the length thereof at a downstream angle to impinge upon each end of an article to center and propel the article along the conduit while injecting air into the spaces between articles, the air supplied by the jets being sufficient to maintain the velocity of the articles through the conduit;

providing a back pressure at the inlet to maintain a positive static pressure in the conduit;

providing a decreasing pressure gradient in the respective air spaces between adjacent articles from the inlet to the outlet to maintain separation between the articles; and exhausting air from the air spaces through one of the conduit side walls in a direction which is lateral to the axes of the articles so that the articles move against and roll along the one side wall.

2. The method of claim 1 wherein the downstream component of the velocity of the air jet at the inlet of the conduit is at least three times the velocity of the articles passing through the conduit.

3. The method of claim 1 wherein the amount of air supplied to the conduit via air jets is selected to provide a positive static pressure with respect to the ambient atmosphere between articles in the conduit substantially equal to $$P = \left[ \frac{N^2 A_j^2 \phi}{A_v^2 + N^2 A_j^2} \right] K_d K_j K_v$$

where $A_j$ is the cross sectional area of the jet, $A_v$ is the cross sectional area of the exhaust opening, $\phi$ is the static pressure in the supply duct, N is the number of jets per vent and $K_d$, $K_j$ and $K_v$ are empirical modifiers.

4. The method of claim 3 including the step of providing a force per jet acting on the article substantially equal to $$F = K_f \rho A_j (V_j \sin\theta - V)^2$$

where $\rho$ is the density of the air, $V_j$ is the velocity of air through the jet, $A_j$ is the cross sectional area of the jet, $\theta$ = angle of jet, $K_f$ is an empirical constant and V is the velocity of the article.

5. A method, as claimed in claim 1, including the further step of:
controlling the pressure gradient so as to maintain the predetermined air spaces between adjacent article as they traverse the length of the conduit.

6. A method, as claimed in claim 1, wherein the step of decreasing the pressure gradient includes:
exhausting air from the conduit along the length thereof from the spaces between the articles at a progressively faster controlled rate from the inlet to the outlet to provide and maintain a positive, differential static pressure with respect to the ambient atmosphere between each pair of adjacent articles in the article conveyor conduit.

7. A method, as claimed in claim 1, including the further steps of:
providing a static pressure variance between the articles by means of the back pressure to raise the articles; and
using the air jet velocity to maintain the article velocity from the inlet to the outlet.

* * * * *